(12) United States Patent
Buehler

(10) Patent No.: US 6,481,600 B2
(45) Date of Patent: Nov. 19, 2002

(54) DROPPER ASSEMBLY

(75) Inventor: John D. Buehler, Bridgeton, NJ (US)

(73) Assignee: Comar, Inc., Buena, NJ (US)

( * ) Notice: Subject to any disclaimer, the term of this patent is extended or adjusted under 35 U.S.C. 154(b) by 0 days.

(21) Appl. No.: 09/750,496

(22) Filed: Dec. 28, 2000

(65) Prior Publication Data

US 2001/0035432 A1 Nov. 1, 2001

Related U.S. Application Data

(60) Provisional application No. 60/173,585, filed on Dec. 29, 1999.

(51) Int. Cl.$^7$ .............................................. B65D 47/18
(52) U.S. Cl. ......................... 222/420; 222/206; 141/24
(58) Field of Search .......................... 222/206, 420; 141/24

(56) References Cited

U.S. PATENT DOCUMENTS

| | | | | |
|---|---|---|---|---|
| 899,015 A | * | 9/1908 | Fitzsimmons | 222/420 |
| 2,237,213 A | | 4/1941 | Brown | |
| 2,800,253 A | * | 7/1957 | Henderson | 141/24 |
| 2,802,605 A | * | 8/1957 | Parker | 141/24 |
| 3,881,527 A | * | 5/1975 | Shapiro | 141/24 |
| 3,881,624 A | * | 5/1975 | Dougherty, Sr. | 141/24 |
| 4,056,129 A | * | 11/1977 | Weiler et al. | 141/24 |
| 4,286,633 A | * | 9/1981 | Herr | 141/24 |
| 4,416,400 A | | 11/1983 | Dougherty, Sr. | |
| 4,633,922 A | * | 1/1987 | Fabbro | 141/24 |
| 4,690,579 A | * | 9/1987 | Tuckman | 141/24 |
| 4,759,755 A | * | 7/1988 | Hein et al. | 222/420 |
| 5,226,572 A | * | 7/1993 | Gargione | 222/214 |
| 5,505,712 A | | 4/1996 | McMillian | |

* cited by examiner

*Primary Examiner*—William C. Doerrler
*Assistant Examiner*—Stephanie Willatt
(74) *Attorney, Agent, or Firm*—Eugene E. Renz, Jr.

(57) ABSTRACT

A dropper assembly comprising a pipette portion, having a proximate end and a distal end, the distal end of said pipette having an opening through which fluid is adapted to flow in the pipette pr9otion; a cap portion having a top wall, the proximate end of the said pipette portion being integrally formed with the top wall of said cap portion on one side thereof; a bulb portion having a flange at one end thereof, said cap portion having an annular wall extending axially outwardly from the opposite side of the top wall thereof, the flange of said bulb portion being positioned on said opposite side of said top wall, and said annular wall being swaged over the flange of said bulb portion, to thereby integrally connect said bulb portion to said cap portion.

4 Claims, 2 Drawing Sheets

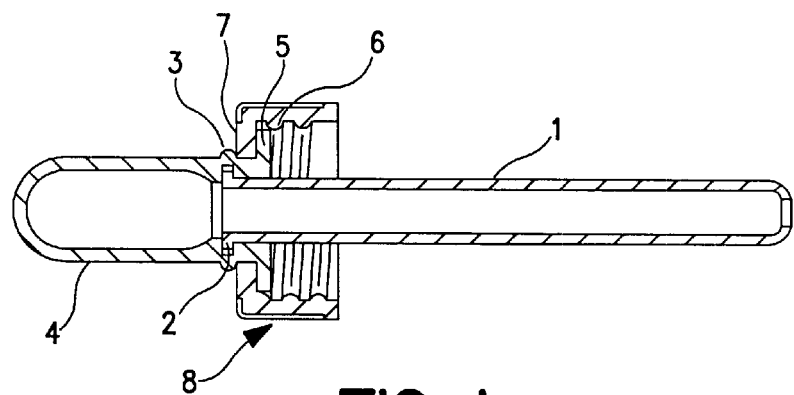
FIG. 1
PRIOR ART
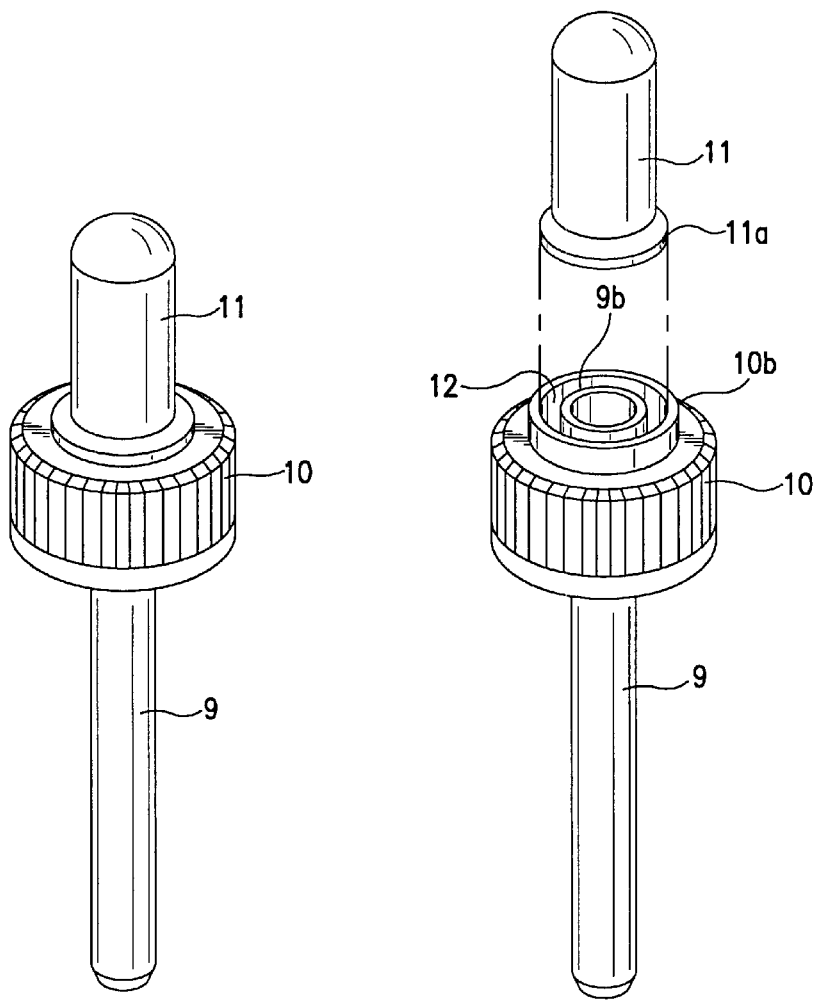
FIG. 2  FIG. 3

DROPPER ASSEMBLY

This application claims the benefit of U.S. Provisional Application No. 60/173,585 filed Dec. 29, 1999.

BACKGROUND OF THE INVENTION

Heretofore, multi-piece dropper assemblies have been proposed, wherein the pipette is detachably connected to a bulb which, in turn, is detachably connected to a threaded cap which provides a closure for a container on which the dropper assembly is mounted. Multi-piece dropper assemblies have been characterized by certain disadvantages; most notably, the time and expense required to manufacture the assemblies, wherein the components are separately molded and then connected to form the dropper assembly. Also, when in use, the pipette portion can become separated from the bulb portion and/or cap resulting in leakage of fluid between the cap portion and the pipette portion.

To overcome the disadvantages experienced with multi-piece dropper assemblies, the dropper assembly of the present invention has been devised.

SUMMARY OF THE INVENTION

The dropper assembly of the present invention comprises, essentially, a pipette portion, integrally molded to a threaded cap portion, and a bulb portion, having a flange integrally connected to the cap by heat swaging a portion of the cap over the flange of the bulb portion. By this construction and arrangement, the bulb portion, cap portion, and pipette portion are integrally connected, thereby preventing the dropper assembly components from being disconnected from each other, whereby leakage of fluid between the cap portion and pipette portion is prevented.

BRIEF DESCRIPTION OF THE DRAWINGS

These and other objects of the present invention and various features and details of the operation and construction thereof are hereinafter more fully set forth with reference to the accompanying drawings, wherein:

FIG. 1 is a sectional, side elevational view of a prior art multi-piece dropper assembly;

FIG. 2 is a perspective view of the dropper assembly of the present invention;

FIG. 3 is an exploded view of the dropper assembly showing the bulb portion prior to being connected to the cap portion;

DESCRIPTION OF THE PREFERRED EMBODIMENT

Figure 4:
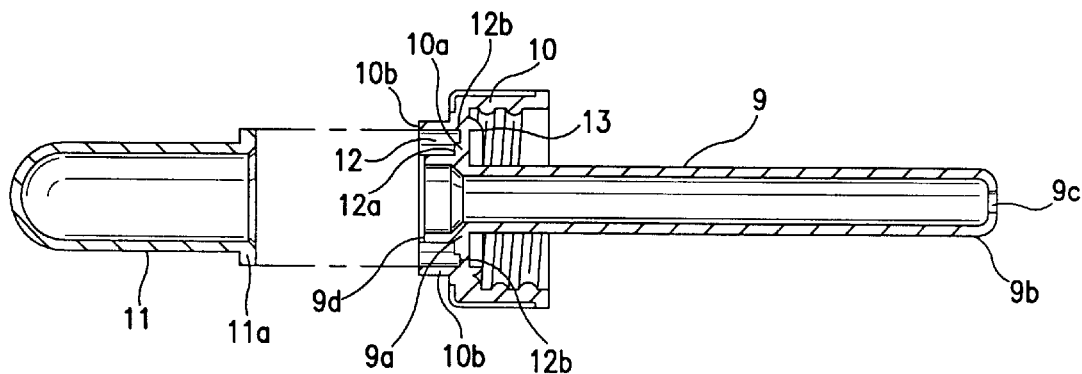
FIG. 4 is a sectional, side elevational view of the dropper assembly shown in FIG. 3.

Referring now to the drawings and particularly to FIG. 1, there is shown a conventional prior art three-piece dropper assembly, wherein a pipette portion 1 is provided with a flange 2 on one end thereof for insertion into a groove 3 provided in a bulb portion 4 having an outwardly extending flange 5 positioned between a thread portion 6 and a top wall 7 of a cap 8. The times when the bulb portion 4 becomes disconnected from the cap 8 and the pipette portion 1 becomes disconnected from the bulb portion 4 resulting in a leakage of fluid between the pipette portion 2 and the cap portion 8.

To overcome the disadvantages experienced with prior art dropper assemblies, the dropper assembly of the present invention has been devised and, as shown in FIG. 2, comprises a pipette portion 9, a cap portion 10, and a bulb portion 11, all integrally connected. Thermoplastic such as the one-piece pipette assembly of the present invention is preferably made of a thermoplastic material such as a polyolefin or a thermoplastic elastomer (TPE).

The details of the construction of the dropper assembly are illustrated in FIGS. 3 and 4, wherein the pipette portion 9 and cap portion 10 are simultaneously molded so that the proximate end 9a of the pipette portion 9 is integrally formed with the top wall 10a of the cap 10. The distal end 9b of the pipette portion is provided with an opening 9c through which fluid is adapted to flow through the pipette portion 9. The proximate end 9a of the pipette portion 9 is provided with an enlarged mouth portion formed by an annular wall 9d integral with the top wall 10a of the cap portion 10 and extending axially outwardly therefrom. The cap portion 10 is similarly provided with an annular wall 10b integral with the top wall 10a of the cap portion 10 and extending outwardly therefrom. The annular wall 10b is spaced radially outwardly from the annular wall 9d to form an annular recess 12 having a bottom wall 12a provided with an annular recess 12b.

Figure 5:
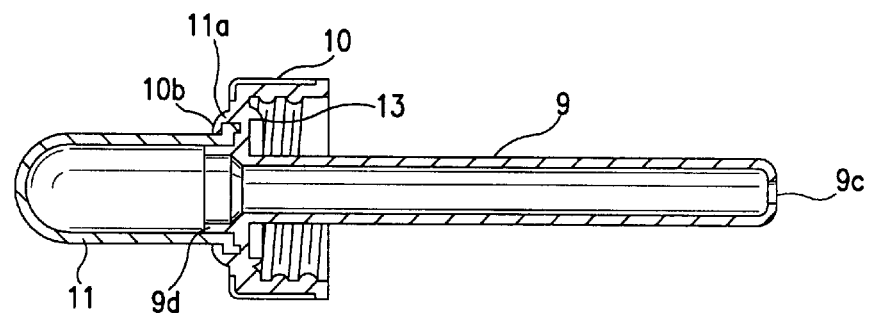
FIG. 5 is a section side elevational view of the dropper assembly showing the bulb portion connected to the cap portion.
Figure 6:
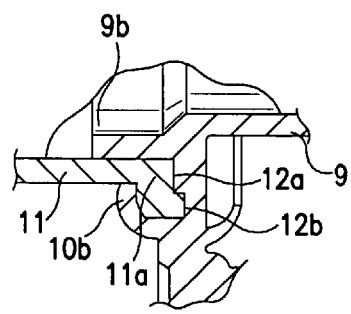
FIG. 6 is an enlarged, fragmentary sectional view showing a portion of the cap being swaged to the flange portion of the bulb.

The details of the connection of the bulb portion 11 to the cap portion 10 are shown in FIGS. 5 and 6, wherein it will be seen that the flanged end 11a of the bulb portion 11 is inserted into the annular recess 12. The cap portion 10 is heated and the annular wall 10b is swaged over the flange portion 11a causing a portion of the flange to be squeezed into the annular recess 12b, to thereby form a leak tight connection between the bulb portion 11 and cap portion 10.

To complete the construction of the dropper assembly, a claw-style linerless seal 13 is integrally formed on the lower surface of the top wall 10a of the cap portion 10.

From the above description, it will be readily apparent to those skilled in the art that the dropper assembly of the present invention is an improvement over the prior art multi-piece dropper assemblies in that by integrally molding the pipette portion 9 to the cap portion 10 and by swaging the bulb portion 11 on the cap portion 10, a dropper assembly is provided wherein the components of the assembly are integrally connected, thereby preventing the components from becoming disconnected.

Even though particular embodiments of the present invention have been illustrated and described herein, it is not intended to limit the invention and changes and modifications may be made therein within the scope of the following claims.

What is claimed is:

1. A dropper assembly comprising a pipette portion, having a proximate end and a distal end, the distal end of said pipette having an opening through which fluid is adapted to flow in the pipette portion; a cap portion having a top wall with a top side and a bottom side, the proximate end of the pipette portion being integrally formed with the bottom side of said top wall of said cap portion, said cap portion having a first annular wall extending axially outwardly from the top side of the wall; a bulb portion having a flange at one end thereof, the flange of said bulb portion being positioned on said top side of the top wall, and said first annular wall being swaged over the flange of said bulb portion, to thereby integrally connect said bulb portion to said cap portion; an enlarged mouth portion on the proximate end of said pipette portion, said enlarged mouth portion being formed by a second annular wall extending axially outwardly from said top side of the cap portion top wall, said second annular wall being spaced radially inwardly from said first annular wall, to thereby form an annular space, said top side of said top wall defining a bottom wall for said annular space, the flange of said bulb portion being portioned in said space.

2. A dropper assembly comprising a pipette portion, having a proximate end and a distal end, the distal end of said pipette having an opening through which fluid is adapted to flow in the pipette portion; a cap portion having a top wall with a top side and a bottom side, the proximate end of the pipette portion being integrally formed with the bottom side of said top wall of said cap portion, said cap portion having a first annular wall extending axially outwardly from the top side of the wall; a bulb portion having a flange at one end thereof, the flange of said bulb portion being positioned on said top side of the top wall, and said first annular wall being swaged over the flange of said bulb portion, to thereby integrally connect said bulb portion to said cap portion; an enlarged mouth portion on the proximate end of said pipette portion, said enlarged mouth portion being formed by a second annular wall extending axially outwardly from said top side of the cap portion top wall, said second annular wall being spaced radially inwardly from said first annular wall, to thereby form an annular space, said top side of said top wall defining a bottom wall for said annular space, a groove being formed in said bottom wall of said annular recess to receive a portion of the flange when the first annular wall is swaged over said flange.

3. A dropper assembly comprising a pipette portion, having a proximate end and a distal end, the distal end of said pipette having an opening through which fluid is adapted to flow in the pipette portion; a cap portion having a top wall with a top side and a bottom side, the proximate end of the pipette portion being integrally formed with the top wall of said cap portion on the bottom side thereof, said cap portion having an annular wall extending axially outwardly from the top side of the top wall thereof; a bulb portion having a flange at one end thereof, the flange of said bulb portion being positioned on said top side of said top wall, and said annular wall being swaged over the flange of said bulb portion, to thereby integrally connect said bulb portion to said cap portion, and a claw-style linerless seal integrally formed on the lower surface of the top wall of the cap portion.

4. A dropper assembly comprising a pipette portion, having a proximate end and a distal end, the distal end of said pipette having an opening through which fluid is adapted to flow in the pipette portion; a cap portion having a top wall with a top side and a bottom side, the proximate end of the pipette portion being integrally formed with the top wall of said cap portion on the bottom side thereof, said cap portion having an annular wall extending axially outwardly from the top side of the top wall thereof; a bulb portion having a flange at one end thereof, the flange of said bulb portion being positioned on said top side of said top wall, and said annular wall engaging over the flange of said bulb portion by heating said annular wall and swaging the annular wall to an overlying position to thereby integrally connect said bulb portion to said cap portion.

* * * * *